Aug. 6, 1968  T. H. FORREST  3,396,102
SEWAGE TREATMENT PROCESS AND APPARATUS
Filed July 10, 1967  5 Sheets-Sheet 1

INVENTOR
Tom H. Forrest
BY Dressler, Goldsmith, Clement & Gordon
ATTORNEYS

United States Patent Office 3,396,102
Patented Aug. 6, 1968

3,396,102
**SEWAGE TREATMENT PROCESS
AND APPARATUS**
Tom H. Forrest, Evanston, Ill., assignor to FMC Corporation, a corporation of Delaware
Continuation-in-part of application Ser. No. 468,705, July 1, 1965. This application July 10, 1967, Ser. No. 652,199
20 Claims. (Cl. 210—7)

ABSTRACT OF THE DISCLOSURE

This application deals with a method of treating sewage wherein the aeration step is a so-called complete mixing operation and the mixed liquor discharged from the aeration zone is introduced into a settling zone with uniform distribution with respect to the solid accumulation area of the bottom of the settling tank so that sludge solids will concentrate in strata of relatively uniform solids content when given identical residence time in the settling zone. Accumulated sludge solids are removed from the settling zone by a traveling unit which traverses the accumulation area of the settling zone on a uniform time cycle basis and discharges at least a portion of the sludge solids without mingling the same with sludge from other areas of the accumulation area of the settling zone directly into the aeration tank for mixing with sewage material therein and a clarified effluent is discharged from the upper portion of said settling zone.

---

This application is a continuation-in-part of my copending application S.N. 468,705, filed July 1, 1965, now abandoned, entitled Sewage Treatment Process.

This invention relates to a process for the treatment of sewage. More particularly, it relates to an activated sludge type treatment of sewage. Still more particularly, it relates to a high loading rate activated sludge process wherein the sludge is restricted to a short time of settling and then recycled directly to a zone of complete mixing and aeration.

Briefly, the method of treating sewage of this invention to effect a high degree of removal of Biochemical Oxygen Demand (B.O.D.) comprises mixing sewage and sludge solids from previously aerated sewage with mixed liquor containing residual dissolved oxygen in an aeration zone wherein agitation conditions maintain the contents of the zone as a substantially homogeneous mixture, introducing gas containing oxygen into said mixture to aerate the same and to maintain the condition of having residual dissolved oxygen present therein removing aerated mixture from the aeration zone and introducing the same into a gravity settling zone with substantially uniform distribution of the aerated mixture with respect to the sludge accumulation area of the settling zone at the bottom thereof, so that the sludge solids in said aerated mixture will settle by gravity in strata of settling solids which eventually can accumulate in all portions of the sludge accumulation area as a sludge concentrate of relatively uniform solids content if given corresponding residence time in said settling zone, removing settled sludge solids progressively and sequentially from the sludge accumulation area without mingling the same with other sewage material settled on other portions of the area of the bottom of said settling zone and directly introducing at least a portion of said sludge into the aeration zone for mixing with sewage material therein, and discharging clarified liquid from the settling zone.

In the treatment of waste materials by the activated sludge system, raw sewage, having the insoluble solids thereof in suspension or colloidal form, is delivered to an aeration tank where it is mixed with sludge recycled from the final or settling tank. The completeness of B.O.D. removal is dependent upon the minimum level of dissolved oxygen being maintained in dissolved form in the mixed liquor, the quantity of sludge being recycled, the condition of the recycled sludge and the concentration of solids in the mixed liquor which is controllable at least in part by the amount of sludge wasted from the system.

One of the problems in the activated sludge system is maintaining the sludge in a highly active condition through continuous intimate contact with oxygen. The sludge contains aerobic organisms which develop in the mixed liquor in the aeration tank where there is an adequate supply of nutrients and oxygen at all times. When the mixed liquor passes from the aeration tank to a zone, such as a settling tank, the sludge settles to the bottom of the tank where anaerobic conditions can develop due to depletion of the dissolved oxygen content of the liquid. If held too long under anaerobic conditions, the organisms undergo a transformation after which it is difficult to restore their previous active condition and they become relatively ineffective in the propagation of the reaction whereby B.O.D. is removed.

In addition, in conventional activated sludge plants operating with normal return sludge rates, sludge is collected generally in settling tanks into which mixed liquor is introduced in a manner that causes localized concentrations of settled sludge in the vicinity of the inlets. These settling tanks are provided with various types of equipment such as scrapers which move all of the sludge to collection sumps, equipment to empty the sumps and a pumping system for return of sludge to the aeration tank. If the collecting and removal of sludge is not efficient, appreciable portions of sludge can remain in a final tank for sufficient time to become septic or devoid of oxygen in which condition the sludge loses its settling character and in floating further interferes with the settling operation.

Now it has been discovered that when aeration tank contents are maintained homogeneous from the standpoint of oxygen supply and oxygen demand, the sewage treatment process will provide faster and more complete B.O.D. removal, if complete mixing is attained with proper amounts of recycle sludge whose aerobic character remains unaltered due to the fact that its time of retention in the settling tank has not been prolonged, i.e., has been limited so that the sludge available for removal from the settling tank as a sludge concentrate formed adjacent the settling zone floor, has not been in the final settled stage for more than about 30 minutes. The exact residence time of the solids in the form of a sludge concentrate depending upon the size of the settling tank, preferably is limited to between about 10 minutes and 20 minutes.

In accordance with this invention a method of treating sewage is provided which effects a high degree of removal of B.O.D. The method involves a combination of operations in aeration and settling zones operated under very specific interrelated conditions. The aeration operation is of the so-called completed mixing type wherein agitation is arranged to accomplish rapid dissemination of incoming materials, i.e., of sewage and recycle sludge throughout the mixed liquor in the aeration zone.

Mixed liquor discharged from this substantially homogeneous aeration zone is introduced into the tank for the settling operation in a manner provided for substantially uniform distribution of mixed liquor and the solids therein with respect to the floor area of this settling zone upon which settled solids will accumulate. The settling operation is of the type wherein sludge solids settle by gravity substantially uniformly and due to the uniform distribution of incoming material will accumulate in all portions of the sludge accumulation area with a relatively uniform solids content if given uniform residence time in said settling zone. The most settled layer of sludge solids, i.e., sludge adjacent the settling tank floor is removed progressively and sequentially from the settling tank without mingling the solids from one portion of said accumulation area with the settled solids deposited in other portions of the accumulation area by a pick up with an exhaust unit which in each periodic cycle moves to positions adjacent various portions of the tank bottom so that eventually it traverses the entire area of the bottom of the settling zone and limit the sludge accumulated at the bottom to a maximum residence time as settled sludge of less than 30 minutes. By progressively and sequentially is meant that the pick up unit moves to position its intake over accumulation area in the bottom of the settling zone and removes solids in its path to the end of the axis of its movement. Upon reaching the end of the path, the pick up unit can, if the path is circular repeat the movement, or if the path is, for example, a straight line, progressively and sequentially remove solids settled to the bottom after passage of the pick up unit as it reverses the direction of movement and returns to its original starting point.

This removed sludge solids concentrate is moved upwardly out of contact with any other portions of the contents of the settling zone and at least a portion thereof is discharged into the aeration tank for mixing with sewage material therein. A clarified effluent is withdrawn from the upper portion of the settling tank for discharge from the system.

During complete mixing, i.e., agitation to quickly induce a uniform distribution of various components throughout the mixed liquor of the aeration zone, the resulting mixture is aerated and a mixed liquor is discharged to the final tank. The mixed liquor moves through a liquid flow conducting means such as a weir extending along a wall removed from the aeration tank sewage inlet or through spaced apertures in, for example, the wall separating the aeration tank and the final tank.

The purpose of the weir or the spaced apertures is to cause the mixed liquor and the sludge solids therein to flow normal to the direction of movement of the sludge pickup unit and to distribute the sludge solids uniformly throughout the final tank or settling zone where the sludge solids settle. Uniform distribution with respect to the sludge accumulation area at the bottom of the settling zone is required so that sludge solids removed therefrom will have a controlled and preferably uniform short time in the settling zone, thus providing the recycle sludge with a relatively uniform activity.

The flow when, for example, the aeration and settling zones are arranged in side by side tanks of rectangular horizontal planar configuration and having parallel longitudinal axes, moves from the aeration zone to a settling zone generally having a longitudinally extending trough running the length of the zone, which trough is bounded longitudinally so that in the downwardly direction it has a progressively smaller cross section terminating at a floor or horizontal boundary. The angle of the sloping walls may vary between about 70° and 30° from the horizontal. The flow is introduced into this type of final tank a substantial distance below the liquid surface but above any break in the upper walls thereof so that the tank will operate in the fashion of an up-flow clarifier with the sludge accumulating on the longitudinally extending trough bottom for removal. To assure that there is continuous settling and avoidance of solids holdup, scraper type mechanisms may be installed which contact the walls of the tank, particularly if the sloping walls of the hopper bottom thereof have an angle of inclination less than about 50°.

In order to insure maintenance of a proper concentration of solids in the aeration tank, sludge is returned from the settling tank in amounts varying from about 50% to 200% by volume based upon the incoming flow of feed to the aeration compartment which has a loading as set forth hereinbefore of between about 100 pounds and 300 pounds of B.O.D. per day per 1000 cubic feet of tank capacity. When proper operating conditions have been achieved, control of the concentration of the activated sludge in the aeration tank and in the total system is accomplished by discharging to waste any excess portion of the sludge being removed from the settling zone over that required to maintain the predetermined B.O.D.-solids ratio in the aeration zone. Such wasting may be accomplished by inserting a flow channel in a position adapted to intercept a portion of the recycled activated sludge flow or by discharge of activated sludge from the final settling tank.

Sludge is removed continuously from the settling zone, i.e., sludge is always being picked up at some point of the sludge accumulation area of the settling zone.

This removed sludge should have a maximum time as part of the layer of solids accumulated in removable position, on or adjacent the floor of the settling tank, preferably not greater than 30 minutes. Removal of the sludge from each accumulation area in each fixed period is accomplished by a sludge removal unit.

Such a sludge removal unit is preferably adapted to move in the settling zone at a rate generally of 2 to 5 feet per minute. The unit may be adapted to move back and forth over a distance of about 5 to 40 feet of the length of the settling zone. If the settling zone has a length greater than about 40 feet, a multiplicity of sludge removal units may be utilized, each to traverse a fixed length of a zone. These sludge removal units may operate independently or off the same drive mechanism. Each sludge removal unit should have a rate of travel and be adapted to traverse a distance which will insure that each portion of the bottom or horizontal boundary of the settling zone is swept at least once every 15 to 30 minutes and preferably once every 8 to 12 minutes. The sludge removal unit may travel back and forth in a straight path or continuously forward in a circular path depending upon the configuration of the settling zone.

Pickup or removal of sludge solids is accomplished as the footpiece of the sludge removal unit, i.e., an enlarged head generally having an inlet part on the bottom side spanning an area which is small in the direction of travel compared to the width of the floor area from which accumulated solids are to be removed, moves adjacent to and above accumulation areas of the settling zone floor.

As the footpiece moves along, it picks up sludge progressively and sequentially until the entire floor area has been traversed. The rate of travel of the footpiece is sufficiently slow as to cause a minimum of disturbance to sludge settling above the horizontal elevation of the footpiece. After the footpiece picks up the sludge in an area and moves on to the next area, the sludge settling operation goes on unabated in the area just vacated by the footpiece. When the area to be traversed by the footpiece is annular in shape, the footpiece can be adapted for unidirectional travel and a sludge of substantially the same concentration and the same residence time as solids accumulated for removal from the settling tank, can be discharged on a continuous basis. If the settling zone has a configuration, for example, rectangular, which requires that the footpiece have bidirectional travel, i.e., travel back and forth along a single path, sludge solids picked up and discharged due to the basic phenomenon involved in settling will show some variation in solids concentration and some variation in the time solids remain as settled solids at the bottom of the settling chamber. Such variation in solids concentration is small and variation in the time solids remain as settled solids is only a variation dependent upon the time period established for travel from one point of direction reversal to the next, i.e., for travel from one end of the settling zone to the other. As stated before, in this process the time cycle for sweeping the accumulation area floor of the settling tank clear of settled sludge should be such as to limit the length of time sludge remains as settled sludge available for removal on or near the settling tank floor, i.e., in the zone where the inlet to, for example, the air lift will be effective to pick up sludge solids, to about a maximum of 30 minutes. Under these conditions, the length of time prior to pickup during which the sludge being discharged will have been a part of the accumulated solids will be determined by the speed of travel and the distance the sludge removal unit travels. This length of time, as stated previously, preferably should not exceed as a maximum about 30 minutes.

The invention will be further understood from the following description of embodiments of the invention taken in conjunction with the accompanying drawings in which.

In the drawings, the numeral 10 indicates a tank of suitable material of construction. Sewage is introduced into tank 10 through influent channel 11 which permits flow into the tank over a weir 12. Tank 10 is divided into an aeration portion 13 and a final tank portion 14 by a wall 15.

Aeration in tank portion 13 is effected by introduction of air through dispersers 16. Dispersers 16 are supported by their communication with a header 17 which delivers air from a source under pressure which is not shown. Mixed liquor flows from tank portion 13 to settling portion 14 through a port 18.

Settling portion 14 of tank 10 is provided with end walls 19 and 19a. Settling portion 14 is bounded by sidewalls 15 and 20 and by sloping portions 15a and 20a which terminate in a flat floor or boundary 21. Adjacent the wall 20a and spaced therefrom a distance determinable by the average volume flow and the maximum velocity desired in a baffle 22.

Wall 20 is adapted with one or more ports 24 communicating with channel 25 which discharges effluent to a suitable receiving body.

End walls 19 and 19a support a beam member 27. A power source, such as an electric motor 28, is secured to and supported on a bracket 29 which is fixed to and supported by one end of beam member 27. Also supported on the bracket 29 is a conventional gear reduction unit 30. The drive shaft of motor 28 is connected by a suitable coupling 31 to the input shaft of the gear reduction unit 30. Gear reduction unit 30 has an output shaft 32 upon which is mounted a sprocket wheel 33.

Beam member 27 at its end, which is supported on wall 19a, has mounted thereon a bracket 34. Bracket 34 supports a bearing assembly 35 in which is journaled a shaft 36. Shaft 36 has splined thereto an idler sprocket wheel 37. An endless chain 38 is trained over the sprocket wheels 33 and 37 and has the ends thereof pivotally connected to a pin 39 supported by a trolley 40. Electric motor 28, which drives chain 38, may be of a reversing type whose rotation in each direction is controlled by limit switches, but, if desired, mechanical means for periodic reversal of direction of movement of endless chain 38 may also be used.

Trolley 40 includes a frame 43 of a U-shaped cross section having a bottom 44 which is disposed beneath the beam member 27 and sides 45 and 46 which straddle and are spaced from said beam member. Side 45 of trolley 40 has inwardly extending axles 47 and 48 and side 46 has inwardly extending axles 49 and 50, respectively, journaled adjacent each end thereof. Axles 47, 48, 49 and 50 support flanged wheels 51, 52, 53 and 54, respectively. The flanged wheels straddle the web 57 of beam member 27 and rest upon the bottom flange 58 thereof. Thus, the trolley is supported for free travel on flange 58 back and forth above the open top of tank 10. Sides 45 and 46 of trolley 40 are provided with ears 55 and 56 which extend above the top of the beam means 27. Ears 55 and 56 are adapted to support pin 39 to which the ends of chain 38 are secured, in a position above the beam member 27.

A pump 60 of a conventional air lift type is supported by trolley 40 in a position suspended below the beam member 27. The pump 60 includes an elongated conduit 61. The elongated conduit 61 has a footpiece 62 at the lower end thereof positioned adjacent the horizontal boundary 21 of the settling compartment 14 of tank 10. Footpiece 62 is of such a size that it extends nearly across the boundary 21 to adjacent sidewalls 15a and 20a. The footpiece 62 has an inlet port 63 in the form of a slot in the bottom thereof.

Figures 1, 2:
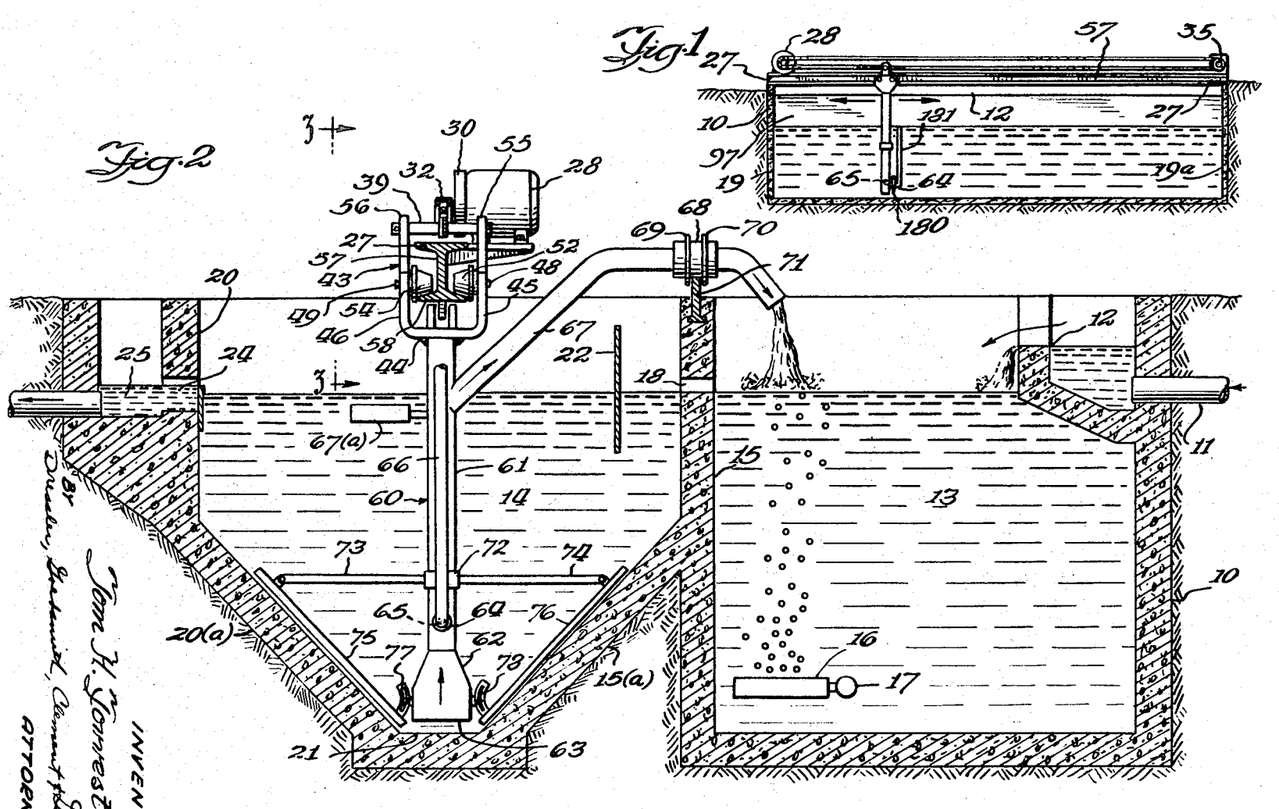
FIGURE 1 is a side elevational view of the aeration tank portion of a unitary structure having contiguous rectangular aeration and final tanks.
FIGURE 2 is a vertical sectional view of the unitary structure showing the contiguous aeration and settling tanks.

Intermediate its ends, the conduit 61 is provided with a coupling 64. A port 65 extends through the coupling 64 and communicates with the interior of conduit 61. A hose 66 leads upwardly from the coupling 64 and connects with a conventional source of compressed air not shown which is positioned externally of the tank 10 for supplying the air for operating the pump 60 to create a suction. The conduit 61 includes an outlet branch 67 which is illustrated as discharging directly into the aeration compartment 13 but may discharge into any suitable overflow weir channel which will direct the recycled sludge into the aeration compartment 13. Because of the distance to be spanned, outlet branch 67 is either counterbalanced by balance weight 67a or as illustrated in FIGURE 1, is supported, or both. The support consists of an externally mounted freely rotatable guide sleeve 68 having spaced flanges 69 and 70 which straddle a guide and support rod 71 mounted atop wall 15.

Conduit 61 is provided with a collar 72 from which arms 73 and 74 extend substantially horizontally. Pivotally connected to the extremities of arms 73 and 74 are scraper members 75 and 76. Scraper members 75 and 76, respectively, are held in a position parallel to and spaced from walls 15a and 20a by slotted brackets 77 and 78 adapted to adjust the angularity of the scraper members 75 and 76, which slotted brackets are secured to footpiece 62.

When this traveling air lift is adapted to travel at a rate of 2 feet per minute in a settling tank having a trough 24 feet in length, sludge settling on any square foot of horizontal apex boundary 21 will be removed once in each 12 minute period.

Figures 3, 4:
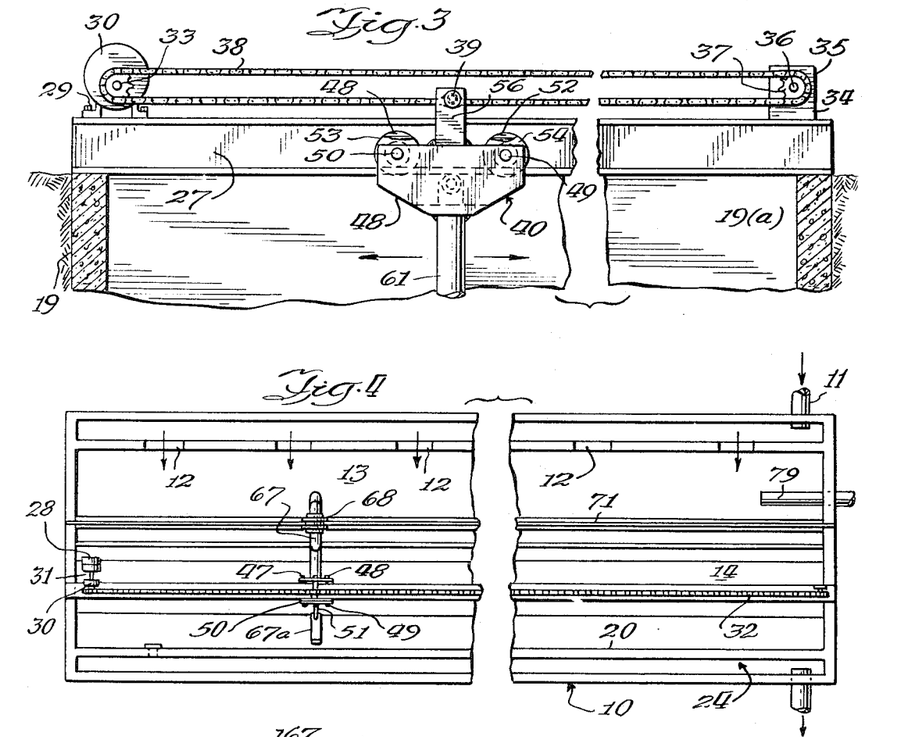
FIGURE 3 is a partial view along the line 3—3 of FIGURE 1.
FIGURE 4 is a top plan view of contiguous rectangular aeration and final tanks.

This sludge may be all returned to aeration compartment 13 or as illustrated in FIGURE 4, the branch pipe 67 may for a portion of its cycle discharge into an extendable trough 79 which can be used to intercept a larger or smaller quantity of the material discharged through branch pipe 67 and convey it out of the system.

Figure 5:
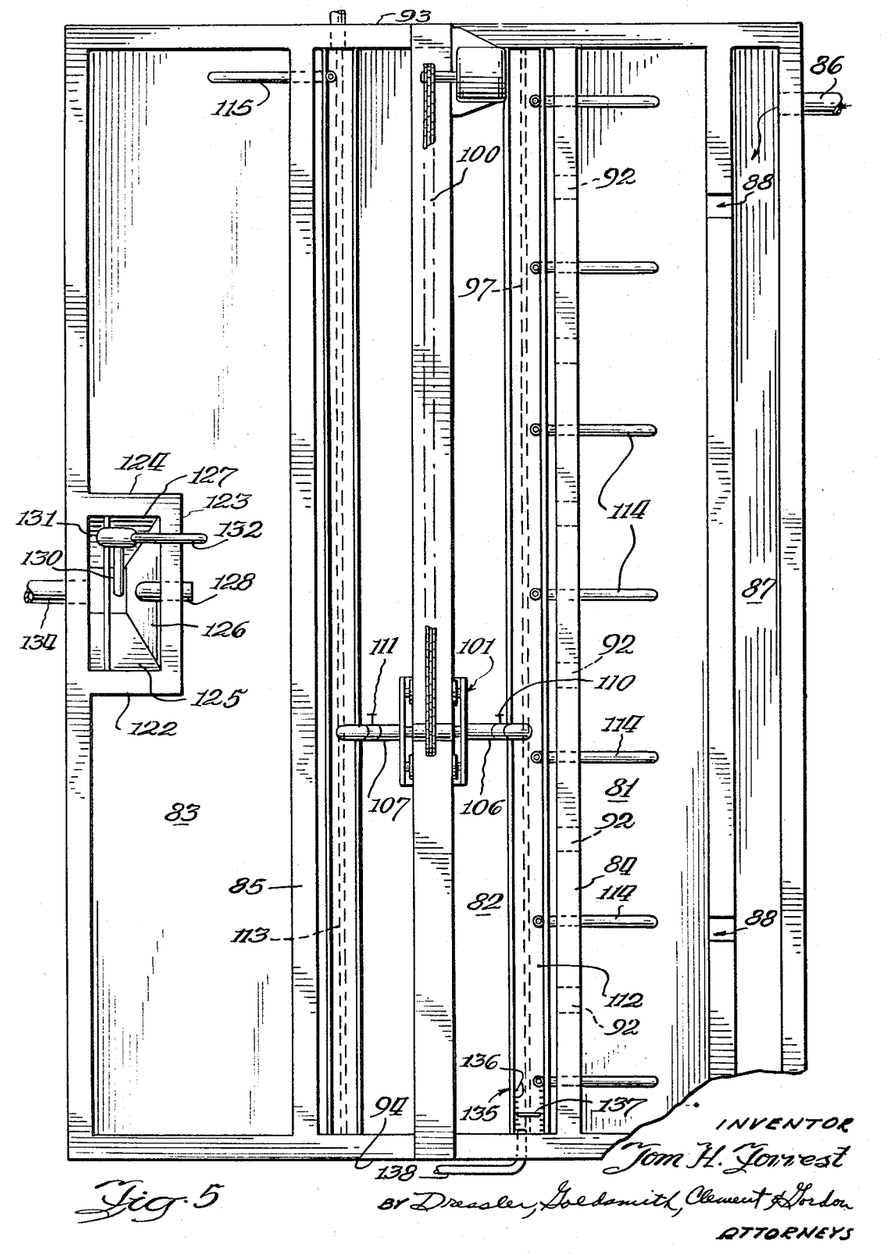
FIGURE 5 is a top plan view of a tank having compartments for aerating sewage-sludge mixture, separating sludge and liquid, and aerating waste sludge.
Figure 6:
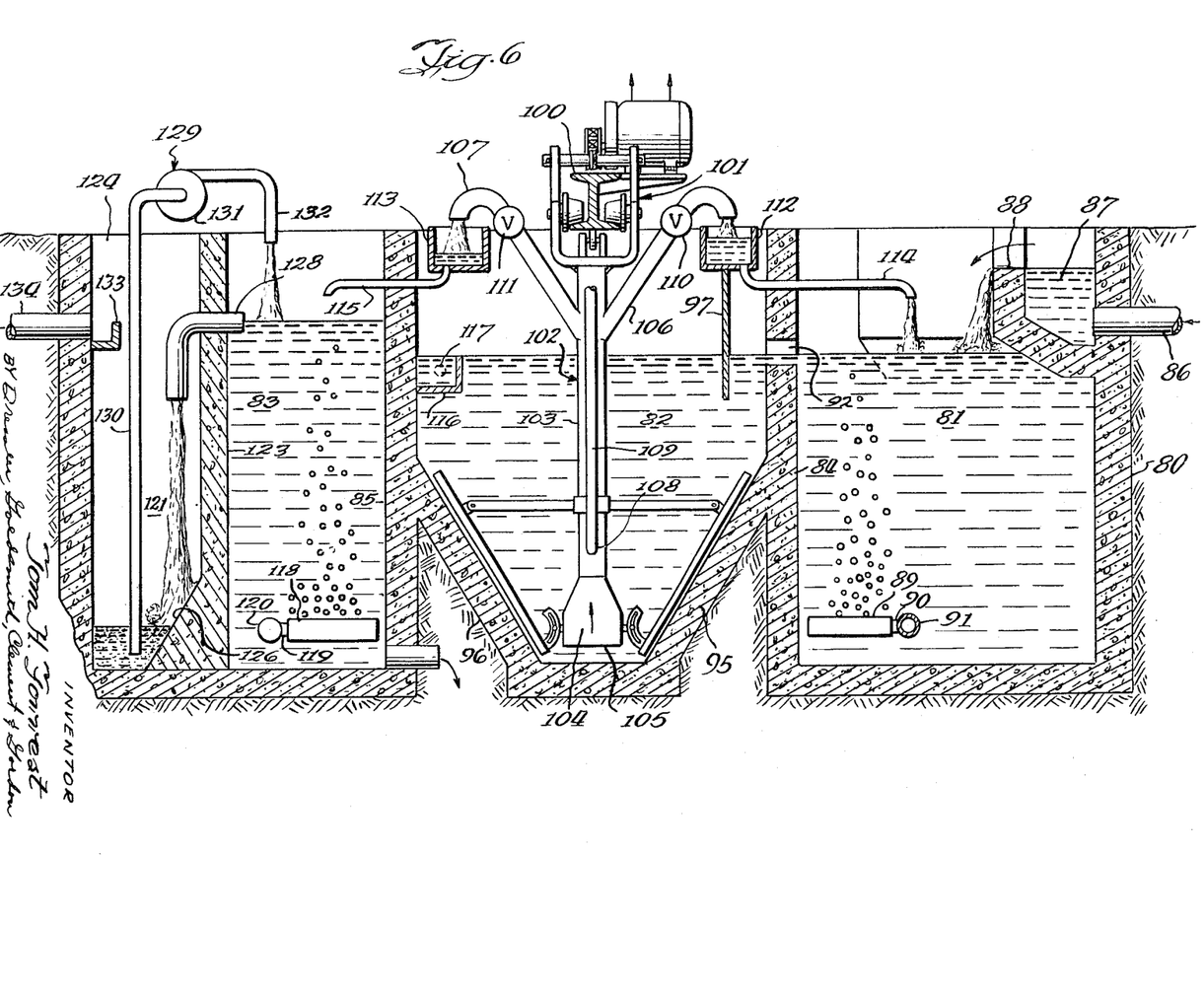
FIGURE 6 is a side elevational view of the three compartment tank of FIGURE 5.

In FIGURES 5 and 6, there is illustrated a tank 80 having three compartments, an aeration compartment 81, a settling compartment 82 and an aerobic digester compartment 83, said compartments being segregated by partitions 84 and 85.

Sewage is introduced into tank 80 through conduit 86 and influent channel 87 which permits flow into compartment 81 over a weir 88.

Aeration in tank 80 is effected by introduction of air through dispersers 89 which are supported by their communication pipe 90 with a header 91. Aerated mixed liquid flows from tank compartment 81 to settling compartment 82 through ports 92.

Settling compartment 82 is bounded at the ends thereof by tank walls 93 and 94 and in its lower portions by sloping walls 95 and 96.

Adjacent wall 84 and spaced therefrom is a baffle 97 to limit turbulence in the area of introduction of aerated mixture.

Wall segments 93 and 94 support a beam member 100 of the type described in FIGURES 1 to 4 on which is mounted a trolley unit 101 similar to that described in connection therewith.

Trolley 101 supports a pump 102 in a position suspended below beam member 100. The pump 102 includes an elongated conduit 103 at the lower end of which is a footpiece 104. Footpiece 104 has an inlet port 105 in the bottom thereof. The conduit 103 is provided with outlet branches 106 and 107. Outlet branch 106 discharges material back into the aeration compartment 81.

Intermediate its ends, the conduit 103 is provided with a coupling 108 which communicates with the interior of conduit 103. A hose 109 leads upwardly from the coupling 108 and connects with a conventional source of compressed air not shown which is positioned externally of the tank 80.

Outlet branches 106 and 107 have the flow therethrough controlled by valves 110 and 111, respectively. Branches 106 and 107 discharge into troughs 112 and 113, respectively. Trough 112 is adapted with spaced outlet pipes 114 which deliver sludge to aeration tank segment 81. Trough 113 is provided with a single outlet pipe 115 which delivers sludge to sludge aeration tank segment 83.

Conduit 103 supports scraper means in the same manner as is described in connection with FIGURES 1 to 4. Partition 85 supports a trough 116 submerged below the liquid level in compartment 82 which receives clarified effluent and discharges it from the system through conduit 117.

Aerobic digester compartment 83 is provided with air through dispersers 118 which are supported by their communication link 119 with a header 120 which delivers air from a source under pressure which is not shown.

Compartment 83 is adapted with a settling portion 121 bounded by vertical walls 122, 123 and 124 which cooperate at their lower ends with sloping walls 125, 126 and 127, respectively, to form a sump. Aerated sludge moves to settling portion 121 of compartment 83 through overflow pipe 128.

Sludge concentrated in the sump of settling portion 121 of compartment 83 is removed by suitable means 129, here illustrated as an inlet pipe 130, a pump 131 and a pump outlet pipe 132 adapted to return the sludge to the sludge aeration portion of compartment 83.

Supernatant liquor formed in settling portion 121 of compartment 83 overflows a weir 133 and is discharged from compartment 121 through conduit 134. Discharged supernatant may be eliminated from the system or returned to the aeration compartment 81. Trough 112 is also provided with means 135 for wasting sludge consisting of spaced slot adjustment lugs 136 adapted to hold an adjustable gate 137 in vertical position. Sludge discharged into the trough on one side of the gate flows to aeration compartment 81 through outlet pipes 114. Sludge discharged into the trough on the other side of the gate is discharged to waste through pipe 138. The number and position of lugs 136 is dependent upon the length of the tank section from which sludge is being pumped to trough 112. Such lugs usually are positioned over a length of trough extending up to 2 feet, for example, for a 20 to 30 foot settling chamber.

Figure 7:
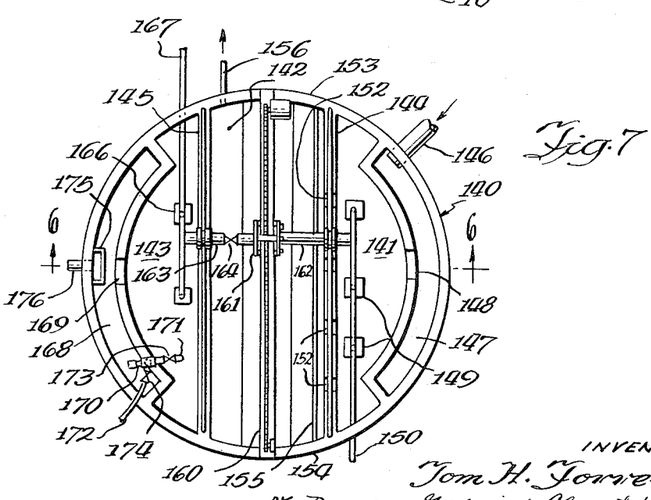
FIGURE 7 is a top plan view of an embodiment of the invention used in a circular tank.

In FIGURE 7, there is illustrated a circular tank 140 having three compartments, an aeration compartment 141, a settling compartment 142 and an aerobic digester compartment 143, said compartments being segregated by partitions 144 and 145.

Sewage is introduced into tank 140 through conduit 146 and influent channel 147 which permits flow into compartment 141 over a weir 148.

Aeration in compartment 141 is effected by introduction of air through dispersers 149 which are supported by their communication with a header 150. Aerated mixed liquor flows from tank compartment 141 to settling compartment 142 through submerged ports 152.

Settling compartment 142 is bounded at the ends thereof by tank periphery wall segments 153 and 154. Adjacent wall 144 and spaced therefrom is a baffle 155 to limit turbulence in the area of introduction of aerated mixture. Clarified liquid is discharged from compartment 142 through conduit 156.

Wall segments 153 and 154 support a beam member 160 of the type described in FIGURES 1 to 6 on which is mounted a trolley unit 161 which supports an air lift pump in a position suspended below the beam member 160. The pump includes, as was described previously, an elongated conduit at the lower end of which is a footpiece having an inlet port in the bottom thereof. The conduit is provided with outlet branches 162 and 163. Outlet branch 162 discharges material back into the aeration compartment 141. Outlet branch 163 discharges material in amounts controlled by valve means 164 into sludge aeration compartment 143.

Aerobic digester compartment 143 is provided with air through dispersers 166 which are supported by their communication link with a header 167 which delivers air from a source under pressure which is not shown. Compartment 143 is adapted with a settling sump 168. Aerated sludge moves into settling sump 168 through port 169.

Sludge concentrated in the sump 168 is removed by suitable means 170 such as an air lift pump for processing, as desired, as by discharge through branch pipe 171 into compartment 143 or through branch pipe 172 for discharge from the system. Flow through branch pipes 171 and 172 is controlled by valves 173 and 174, respectively. Supernatant liquor formed in sump 168 overflows a weir 175 and is discharged through conduit 176.

In FIGURE 1, a modification of the equipment is shown so that the air lift device may operate for simultaneous scum skimming and sludge removal. Air lift pipe 61 has joined thereto by a nipple 180, a rigid scum pipe 181 whose upper end terminates just below the surface of the liquid in settling compartment and has a lower outlet opening into the air lift pipe 61 between the inlet end thereof and the point of introduction of air for creating the reduced pressure whereby liquid material is moved through said conduit.

Figure 8:
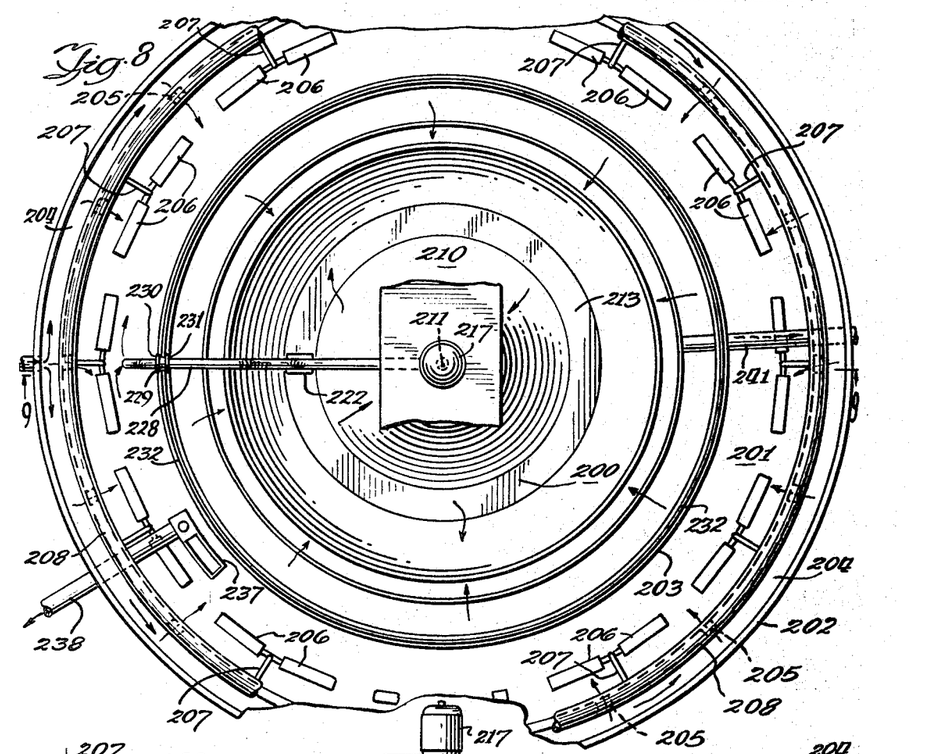
FIGURE 8 is a top plan view of an embodiment of the invention wherein the aeration and settling tanks are arranged concentrically around a common axis.
Figure 9:
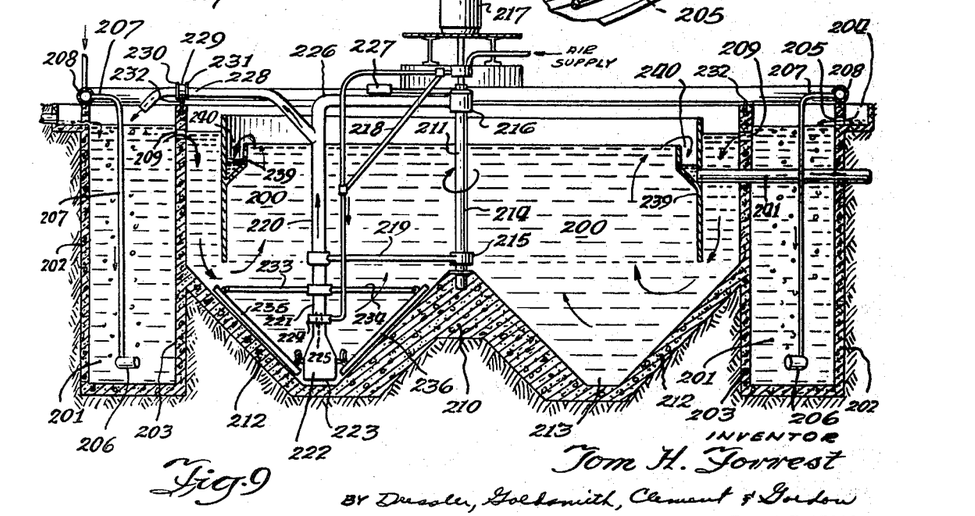
FIGURE 9 is a vertical sectional view along the line 9—9 of FIGURE 8.

Referring to FIGURES 8 and 9, the sewage treatment apparatus embodying the present invention comprises a cylindrical center settling tank 200 and a concentric aeration tank 201. The concentric tank walls are identified as an outer wall 202 and an inner wall 203. Sewage is introduced into tank 201 through influent channel 204 which permits flow into the tank over a weir 205. Aeration in tank 201 is effected by introducing air through dispersers 206. Dispersers 206 are supported by their communication pipe 207 with a header 208 which delivers air from a source not shown. Mixed liquor flows from aeration tank 201 to settling tank 200 through ports 209 in the upper portion of inner wall 203.

Settling tank 200 is provided along the vertical axis with a pyramidal base 210 on whose apex is mounted a vertical post member 211. Adjacent the bottom of inner wall 203, the settling tank 200 is adapted with a fillet member 212. Between the pyramidal base 210 and the fillet member 212, there is formed horizontal floor 213 of annular configuration.

Vertical post member 211 has mounted on it a cylindrical member 214 supported by bearings 215 and 216 and adapted to be rotated by a prime mover 217. Cylindrical member 214 supports through spaced arms 218 and 219, a sludge removal unit 220. Sludge removal unit 220 includes an elongated conduit 221 having a footpiece 222 at the lower end thereof positioned adjacent horizontal floor 213. Footpiece 222 is of such size that it substantially spans the width of the annular floor 213. The footpiece 222 has an appropriate shaped inlet port 223 in the bottom thereof.

Intermediate its ends, the conduit 221 is provided with a coupling 224. A port 225 extends through the coupling 224. A port 225 extends through the coupling 224 and communicates with the interior of conduit 21. A piping member 226 connects the coupling to a compressor 227 mounted on arm 214 and driven by electrical power from a source not shown.

The conduit 221 includes an outlet branch 228 which is illustrated as discharging directly into the areation tank 201. Because of the distance spanned, outlet branch 228 is supported, i.e., has a freely rotatable guide sleeve 229 having spaced flanges 230 and 231 which straddle a guide and support rail 232 mounted on inner wall 203.

Conduit 221 is provided with a collar from which extend arms 233 and 234, the extremities of which support sidewall scraper members 235 and 236 similar in design to those illustrated in FIGURE 2.

The upper end of inner wall 203 has positioned on the aeration tank side thereof, a trough 237 which extends a predetermined distance along the wall periphery. Trough 237 is adapted at one end with an outlet pipe 238 which conveys sludge trapped in the trough as it intercepts the flow from outlet branch 228 of conduit 221, to a point outside the system for wasting.

The inner wall 203 supports on the settling tank side thereof a baffle wall 239. Baffle wall 239, in turn, has secured to it on the tank center side thereof a final effluent launder 240 which extends along the entire length of wall 203. Effluent launder 240 is adapted with an effluent pipe 241 which conveys clarified liquid from the plant.

When sewage is to be treated in the equipment illustrated in FIGURES 1 and 2, at a design rate of 100,000 gallons of raw sewage per day, the volume of mixed liquor being held under aeration, i.e., in the aeration tank, will be 1700 cubic feet with an average loading rate of 100 pounds of B.O.D. per 1000 cubic feet of aeration tank volume per day. This sewage is introduced into the cross flow tank along a longitudinal weir extending a total of 20 feet of the overall 24 foot length of tank. Discharge of mixed liquor in this complete mixing, cross flow system to a final or settling tank having a capacity of 10,000 gallons is over a weir positioned along the entire 24 foot longitudinal length of the wall opposite the inlet weir such as is illustrated in FIGURES 1 and 2. Effluent separated in this final tank is discharged at a rate of 100,000 gallons per day, the effluent produced will have less than 25 mg. per liter of B.O.D. The traveling air lift operating at a linear rate of movement of 3 feet per minute travels the full length of the settling tank in each direction in approximately 8 minutes. Sludge removed from adjacent the bottom of the settling tank by the air lift pump will be discharged at a rate of about 70 gallons per minute having a solids concentration of 0.6%.

The above-detailed description of this invention has been given by way of illustration without any intention that the invention be limited to the exact conditions set forth. No unnecessary limitations should be understood therefrom, as modifications will be obvious to those skilled in the art. The apparatus illustrated in FIGURE 2, for example, illustrates a supported discharge arm for the sludge air lift pump. Such an arm may be adapted for discharge into a trough as illustrated in FIGURE 6. Modification is likewise possible in the apparatus illustrated in FIGURE 6. This air lift pump is provided with two discharge arms provided with valves to control the proportion of the total flow to be discharged through each. Either of these arms or both may be adapted for support as illustrated in FIGURE 2 or by equivalent support means.

I claim:

1. Apparatus for treating sewage comprising aeration and settling tanks, said settling tank being formed so as to define an accumulation area for settled sludge at the bottom thereof, means for supplying influent sewage to said aeration tank, means for introducing air into said aeration tank to aerate the tank contents, a first liquid flow conducting means connecting said aeration tank and said settling tank, said flow conducting means introducing the liquid and sludge solids into said settling tank with provision for uniform distribution thereof with respect to said accumulation area, a second liquid, flow conducting means for introducing liquid into said aeration tank, said second liquid flow conducting means providing for substantially uniform distribution of said liquid with respect to said aeration tank, movable conduit means and means to move the same to traverse said accumulation area for progressively removing in a predetermined sequential pattern sludge settled in the bottom of said settling tank, said conduit means having an inlet located adjacent the bottom of said settling tank and communicating with said second liquid flow conducting means for discharge of the sludge therethrough in the same sequence as said sludge was removed from the bottom of said settling tank, means associated with said conduit means for inducing movement of sludge through said inlet and through said conduit means, and means for discharging clarified liquid from said settling tank.

2. Apparatus according to claim 1 in which the liquid flow conducting means has provision for uniform distribution of the liquid being transferred with respect to the accumulation area of said settling tank and said movable conduit means has the outlet positioned to discharge during part of its travel directly into said aeration chamber and during the remainder of its travel into channel means having an outlet outside the tank whereby sludge is wasted from the system.

3. Apparatus according to claim 1 in which channel means is positioned above the normal liquid level in said aeration tank and in the path for discharge of liquid from said liquid conducting means whereby at least a portion of the flow of sludge is intercepted and piping means communicating with said channel means whereby the intercepted portion of the sludge is conveyed outside the sewage treatment tanks.

4. Apparatus for treating sewage comprising aeration and settling tanks aligned with substantially parallel longitudinal axis and separated by a common wall partition, said settling tank being formed so as to define an accumulation area for said sludge at the bottom thereof, means for supplying influent sewage to said aeration tank, means for introducing air into said aeration tank to aerate the tank contents, liquid flow conducting means connecting said aeration tank and said settling tank, said flow conducting means introducing the liquid into the settling tank in a direction normal to said common wall partition and with provision for uniform distribution thereof with respect to said accumulation area at the bottom thereof, conduit means movable lengthwise of said settling tank with its inlet adjacent said accumulation area for the sludge and an outlet positioned to discharge into said aeration tank, means associated with said conduit means for inducing movement of sludge through said inlet and through said conduit means and means for discharging said clarified liquid from said settling tank.

5. Apparatus according to claim 4 wherein said accumlation area is bounded so as to form a trough parallel to said common wall partition, channel means is positioned in liquid receiving relationship with the outlet from said conduit means for removing sludge from said settling compartment and said channel means is provided with means for partitioning the received sludge and directing a portion thereof into said aeration compartment and the remainder of said received sludge to waste.

6. Apparatus according to claim 4 wherein the movable conduit means is provided with means for supplying air under pressure to the interior thereof whereby sludge in the bottom of said settling tank is induced to move through the inlet to and through said conduit means.

7. Apparatus for treating sewage comprising aeration and settling tanks formed concentric about a common axis and having a cylindrical partition wall separating said tanks, said settling tank having the lower portion thereof formed as an annular trough concentric about the common axis of said tanks, means for supplying influent sewage to said aeration tank, means for introducing air into said aeration tank to aerate the contents thereof, liquid flow directing means connecting said aeration tank to said settling tank, said liquid flow directing means providing for introduction of the liquid at regular intervals along the periphery of said settling tank to effect uniform distribution thereof, a support member centrally disposed in said settling tank, conduit means movable along the annular trough with its inlet adjacent the bottom of the settling tank and an outlet positioned to discharge into said aeration tank, suspension means for said conduit means rotatably mounted on said support member, means for rotating said suspension means, tubular means communicating with the interior of said conduit means and with a source of air under presure, a launder positioned within said settling tank adjacent the normal liquid level therein, piping means communicating with said launder for emptying of liquid therefrom, a channel positioned on the aeration tank side of said partition wall above the normal liquid level in said aeration tank of a length extending along only a minor portion of the circumferential length of said partition wall in a position to intercept discharge from said conduit means and piping means communicating with said channel for emptying liquid material therefrom.

8. Apparatus for treating sewage comprising aeration and settling tanks formed concentric about a common axis and having a cylindrical partition wall separating said tanks, said settling tank at the axial center thereof having a conical shaped island and having the lower portion comprising an annular trough, concentric about the common axis of said tanks, means for supplying influent sewage to said aeration tank, means for introducing air into said aeration tank to aerate the contents thereof, ports spaced at regular intervals in said partition wall adjacent the liquid level normally maintained in said aeration tank, a vertical post member supported by said island, vertically spaced horizontal support beams rotatably mounted on said post, power means for rotating said beams, conduit means supported by said horizontal support beams, said conduit means having an inlet positioned adjacent the flat bottom of said annular trough and an outlet arm portion extending beyond said cylindrical partition wall, means associated with said conduit means for inducing movement of sludge through said inlet and through said conduit means, a launder positioned within said settling tank adjacent the normal liquid level, piping means communicating with said launder for emptying of liquid therefrom, a channel positioned on the aeration tank side of said partition wall above the normal liquid level in said aeration tank of a length extending along only a minor portion of the circumferential length of said partition wall in a position to intercept discharge from said conduit means and piping means communicating with said channel for emptying liquid material therefrom.

9. Apparatus for treating sewage comprising in combination aeration and settling tanks separated by a common wall partition said settling tank being bounded so as to form a trough parallel to the partition separating said aeration and settling tanks, said trough being of progressively smaller cross section and terminating in a horizontal bottom boundary, means for supplying influent sewage to said aeration tank, means for supplying air to said aeration tank, means for discharging sludge containing material from said aeration tank to said settling tank, said means providing uniform distribution of flow along the length of said partition separating said tanks, conduit means movable lengthwise of the trough of said settling tank with its inlet positioned adjacent the bottom of said settling tank having a width slightly smaller than the transverse dimension of the bottom of said trough for reception of sludge concentrating in the bottom of said settling tank, means for creating suction at said inlet moving said sludge from its original point of deposition at the bottom of said settling tank through said inlet into said conduit means and conducting said sludge upwardly out of contact with settling tank contents, outlet means for discharging a portion of said removed sludge into said aeration tank and the remainder of said sludge to waste and means for discharging clarified liquid from said settling tank.

10. Apparatus for treating sewage comprising in combination aeration, settling and aerobic digestion tanks, means for supplying influent sewage to said aeration compartment, means for supplying air to said aeration compartment, liquid flow conducting means for discharging sludge containing material from said aeration tank to said settling tank, said flow conducting means introducing the liquid into said settling tank with provision for uniform distribution thereof with respect to said accumulation area, means for discharging clarified liquid from said settling compartment, conduit means movable within said settling tank to traverse said accumulation area with inlet positioned adjacent the bottom of the settling tank for conducting said removed sludge upwardly out of contact with other settling tank contents and having conduit outlet means for distributing one portion of the sludge into said aeration tank and the remainder of said removed sludge into said aerobic digestion tank, means for supplying air to said aerobic digestion tank, means for discharging matter from said aerobic digestion tank to a clarification chamber, means for discharging supernatant liquor from said clarification chamber and means for discharging accumulated matter from said clarification chamber to said aerobic digestion tank.

11. Apparatus according to claim 10 which includes means for wasting a portion of the accumulated matter discharged from said clarification chamber.

12. Apparatus for treating sewage comprising in combination aeration, settling and aerobic digestion tanks, said aeration and settling tanks being separated by a common wall partition and said tanks being arranged to provide a unitary structure for complete treatment of sewage, said settling tank being formed so as to define an accumulation area parallel to said common wall partition for settled sludge at the bottom thereof, means for supplying influent sewage to said aeration compartment, means for supplying air to said aeration compartment, liquid flow conducting means for discharging sludge containing material from said aeration tank to said settling tank, said flow conducting means introducing the liquid into said settling tank with provision for uniform distribution thereof with respect to said accumulation area, means for discharging clarified liquid from said settling compartment, conduit means movable within said settling tank to traverse said accumulation area with inlet positioned adjacent the bottom of the settling tank for conducting said removed sludge upwardly out of contact with other settling tank contents and having conduit outlet means, trough means in liquid receiving relationship with said conduit means for removing sludge, means for discharging one portion of said sludge from said trough means into said aeration tank, means for discharging the remainder of said removed sludge from said trough means into said aerobic digestion tank, means for supplying air to said aerobic digestion tank, means for discharging matter from said aerobic digestion tank to a clarification chamber, means for discharging supernatant liquor from said clarification chamber and means for discharging accumulated matter from said clarification chamber to said aerobic digestion tank.

13. A method of treating sewage which comprises mixing sewage and sludge solids from previously aerated sewage with mixed liquor in an aeration zone wherein the mixture is maintained substantially homogeneous, introducing gas containing oxygen into said mixture to aerate the same, removing aerated mixture from the aeration zone, introducing said removed mixture and distributing it in a substantially uniform pattern into a gravity settling zone, removing a concentrate of sludge solids settled adjacent the bottom of the sludge accumulation area of said settling zone progressively and sequentially from the sludge accumulation area of the settling zone without mingling the same with other sewage material settled on other portions of the area of the bottom of said settling zone, introducing said concentrate of sludge solids in the same progressive and sequential manner in which they are removed from said settling zone into said aeration zone with a substantially uniform distribution with respect to said aeration zone, and discharging clarified effluent from the settling zone.

14. A method according to claim 13 wherein the sludge accumulated at the bottom of said settling zone has a residence time as settled sludge of less than 30 minutes.

15. A method according to claim 13 wherein the treatment of sewage is carried out in contiguous aeration and settling zones separated by a common wall partition, said settling zone being bounded in its lower extremities so as to form a trough parallel to said common wall partition separating said aeration and settling zones, and aerated mixture flows from said aeration zone to said settling zone with relatively uniform distribution along the length of said partition separating said zones.

16. A method according to claim 13 wherein the mixture from the aeration tank is separated in the settling zone into a scum layer, a clarified effluent and a sludge concentrate, said scum layer being received into and being moved with the sludge for concurrent discharge from said settling zone.

17. A method according to claim 13 wherein the sludge returned for mixing with the mixed liquor in said aeration zone is in quantities constituting between about 50% and 200% by volume based upon the volume of incoming sewage.

18. The method according to claim 13 wherein the sludge removed from the settling zone is continuously discharged into the aeration zone and a portion of said sludge is periodically intercepted for wasting from the system.

19. The method according to claim 13 wherein the mixed liquor is a medium containing residual dissolved oxygen and the mixture of sewage, sludge solids and mixed liquor has gas introduced therein to maintain the condition of having residual dissolved oxygen present.

20. The method according to claim 13 in which there are aeration, settling and aerobic digestion zones, said settling zone being contiguous to both the aeration and aerobic digestion zones, and said sludge solids removed from the settling zone progressively and sequentially are split to discharge one portion into the aeration zone and to discharge the remainder to said aerobic digestion zone.

References Cited

UNITED STATES PATENTS

| | | | |
|---|---|---|---|
| 1,892,648 | 12/1932 | Bousman | 210—195 |
| 2,901,114 | 8/1959 | Smith et al. | 210—15 X |
| 3,047,492 | 7/1962 | Gambrel | 210—15 X |
| 3,173,866 | 3/1965 | Lefton et al. | 210—14 X |
| 3,235,083 | 2/1966 | Sontheimer et al. | 210—527 X |
| 3,330,413 | 7/1967 | Danjes | 210—195 |

FOREIGN PATENTS

| | | |
|---|---|---|
| 489,452 | 7/1938 | Great Britain. |
| 920,647 | 3/1963 | Great Britain. |

MICHAEL E. ROGERS, *Primary Examiner.*